Feb. 26, 1957 H. P. BAIR Re. 24,282
COMBINED STEPLADDER
Original Filed Sept. 12, 1952 3 Sheets-Sheet 1
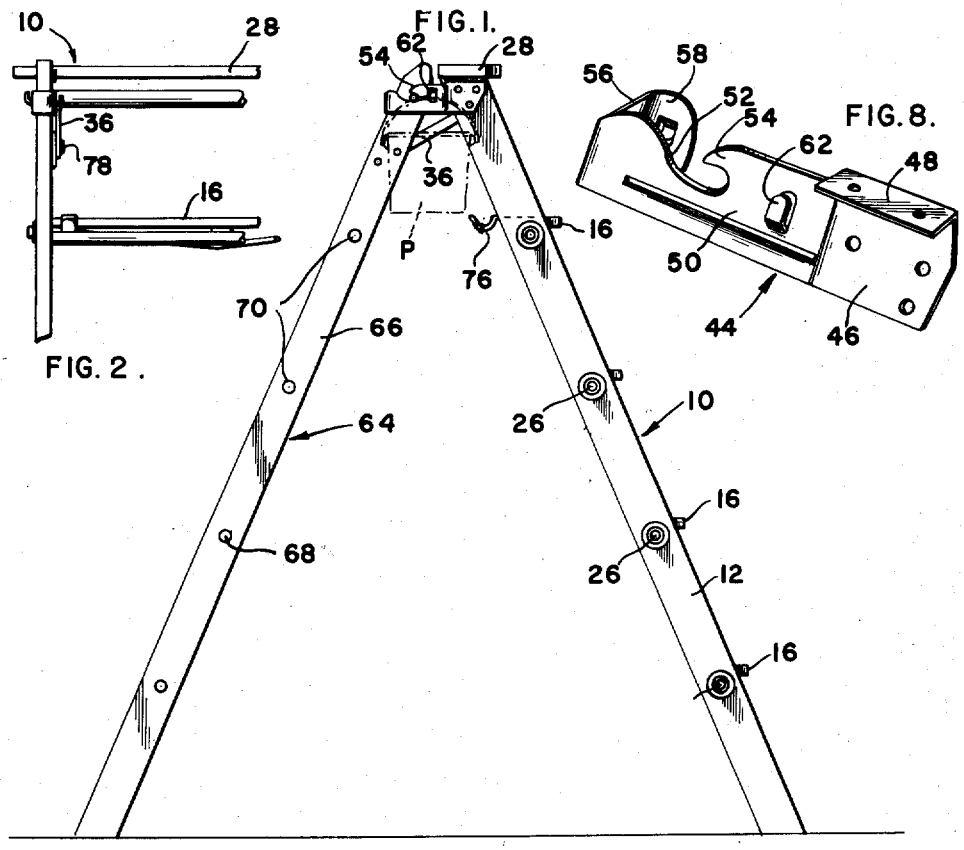
FIG. 2.
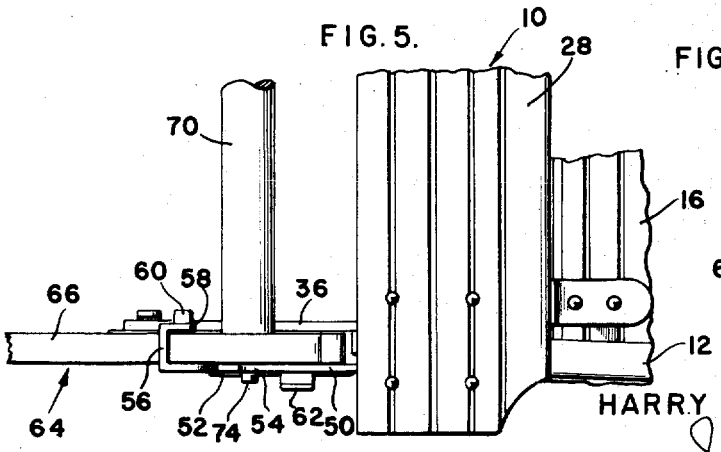
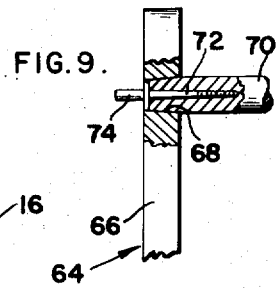
INVENTOR
HARRY P. BAIR
BY J. T. Dowling
J. R. Dickman Jr.
ATTORNEY COMBINED STEPLADDER
Original Filed Sept. 12, 1952 3 Sheets-Sheet 2
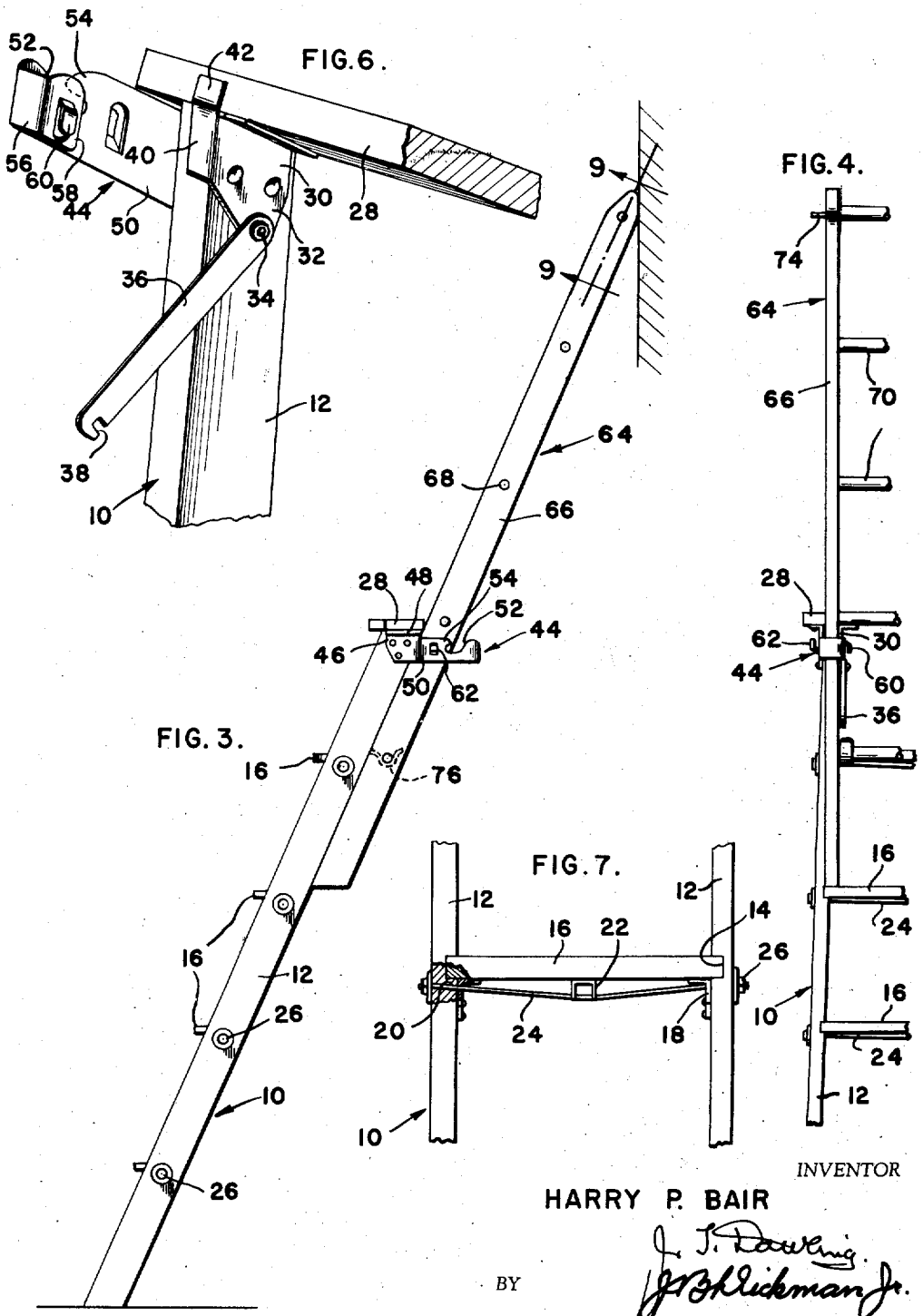
INVENTOR
HARRY P. BAIR
BY J. T. Dowling
J. B. Hickman Jr.
ATTORNEY Feb. 26, 1957 H. P. BAIR Re. 24,282

COMBINED STEPLADDER

Original Filed Sept. 12, 1952 3 Sheets-Sheet 3

INVENTOR
HARRY P. BAIR
J. S. Dowling
J. B. Dickman Jr.
BY
ATTORNEY

United States Patent Office

Re. 24,282
Reissued Feb. 26, 1957

24,282

COMBINED STEPLADDER

Harry P. Bair, Baltimore, Md., assignor of fifty percent to Roger I. Bair, Baltimore, Md.

Original No. 2,675,155, dated April 13, 1954, Serial No. 309,315, September 12, 1952. Application for reissue April 28, 1955, Serial No. 504,706

5 Claims. (Cl. 228—29)

Figure 10:
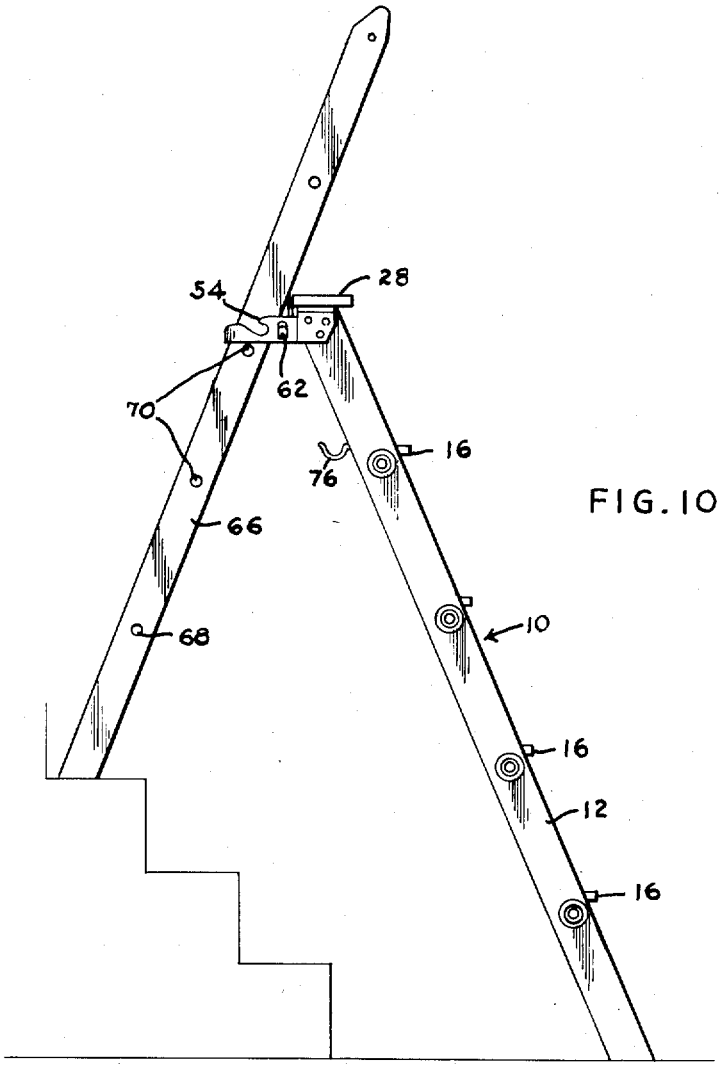

Matter enclosed in heavy brackets [ ] appears in the original patent but forms no part of this reissue specification; matter printed in italics indicates the additions made by reissue.

This invention relates to a combination ladder and has for its primary object a ladder which may be employed as a step ladder and which may be readily converted into an extension ladder.

Another object is to enable the sections of the ladder to be separated, *and readily and easily reassembled,* so that they may be used independently of one another either as individual units or jointly in supporting a scaffold.

Still another object is to brace the step section of the ladder to eliminate side sway and to reinforce the steps to render them strong and durable.

A still further object is to facilitate the suspension of paint pails, scrub buckets and the like in such a manner that the bails thereof are held out of the way of the open tops of the buckets.

A further important object of this invention is to enable the ladder to be used on stairways or the like and to preserve its stability when so used [.] *, the adaptation or change from its previous position to that for placing on a stairway being effected without disassembling or removing of bolts or other extra parts.*

The above and other objects may be attained by employing this invention which embodies among its features a step section carrying laterally extending parallel brackets adjacent its upper end, said brackets having recesses opening through the upper edges thereof adjacent the ends thereof remote from the step section and extending longitudinally toward the step section to define hooks which project away from the step section, a prop section extending between the brackets, pins carried by the prop section and extending laterally therefrom adjacent the upper end thereof for entering the recesses and engaging the bottom edges of the hooks for detachably coupling the step and prop sections together, and links pivotally connected to the step section and adapted to engage the prop section remote from the pins to hold the step and prop sections at a definite angle to one another.

Other features include guides carried by the brackets and partially embracing the side rails of the prop section to guide the prop section relative to the step section both when the prop section is used as a prop, or an extension of the step section.

*The invention includes the provision of simple and effective means for securely holding the ladder sections in any of the given positions, and particularly for preventing relative movement between the prop section and the step section.*

[A further important feature of this invention includes] *As here illustrated, for this purpose I have provided* hooks carried by the guides and extending outwardly and downwardly from adjacent sides thereof for receiving the links and holding them extending between adjacent rungs of the prop section.

Still other features include the depending truss member carried by each step of the step section midway between opposite side rails of said step section and a tie bar extending through the side rails of the step section below [each step] *one or more of the steps* thereof and engaging the truss member in such a manner as to be bowed thereby, to support its respective step and prevent side sway of the step section.

Figure 11:
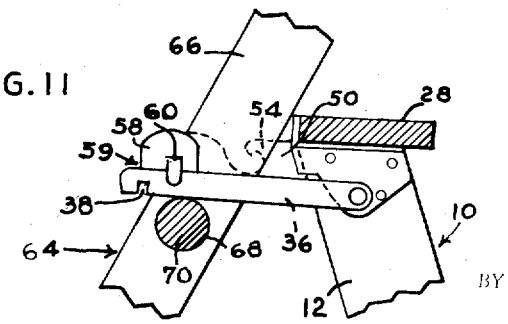

In the drawings,

Figure 1 is a side view of this improved combination ladder showing it in use as a step ladder, Figure 2 is a fragmentary view of the ladder illustrated in Figure 1 from the front side thereof, Figure 3 is a side view of the ladder showing it in use as an extension ladder, Figure 4 is a fragmentary view of Figure 3 taken from the inner side thereof, Figure 5 is a fragmentary plan view on an enlarged scale of the top of the ladder as illustrated in Figure 1, Figure 6 is an enlarged fragmentary sectional view of one corner of the step section of the ladder, Figure 7 is a fragmentary face view of the step section, Figure 8 is a perspective view of one of the brackets employed in coupling the step section with the prop section, Figure 9 is a fragmentary enlarged sectional view taken substantially on the line 9—9 of Figure 3, Figure 10 is a side view of the ladder showing it in use on a [starway] *stairway,* and Figure 11 is an enlarged detail sectional view of Figure 10.

Referring to the drawings *as here shown* in detail this improved combination ladder comprises a step section designated generally 10 which is constructed of elongated side rails 12 which are provided with transversely extending grooves 14 for the reception of opposite ends of steps 16. Carried by each side rail 12 immediately below each groove 14 is an angle bracket 18 the upper flange of which lies flush with the bottom edge of the adjacent groove, and formed in each side rail 12 and angle bracket 18 are aligning openings 20, the purpose of which will hereinafter appear. Carried by and depending from each step 16 midway between opposite ends thereof is a truss member 22 and extending through the openings 20 in the side rails 12 and engaging the lower edge of the truss member 22 is a tie rod 24 which is preferably threaded adjacent opposite ends to receive clamp nuts 26 by which the side rails are drawn inwardly into tight contact with the ends of the steps 16 to not only reinforce and brace the respective steps 16 but also to avoid side sway of the step section 10 when in use.

As in conventional step ladders, the top step 28 thereof extends beyond opposite ends of the top edges of the side rails 12 and the step 28 is coupled adjacent its opposite ends to the side rails by angle brackets 30 each of which is provided with a depending extension 32 to which is pivotally connected as at 34 a link 36 having a notch 38 extending therethrough adjacent its end remote from the pivot 34 for a purpose to be more fully hereinafter explained. Carried by each bracket 30 and extending over the rear face of an adjacent side rail 12 is a flange 40 having a guide shoe or tongue 42 integral therewith which shoe or tongue overlies a portion of the adjacent top step 28 as will be readily understood upon reference to Fig. 6.

Carried by each side rail 12 and extending rearwardly therefrom is a bracket designated generally 44 comprising the body 46 which is connected to the adjacent side rail 12 and carries an [angular] *angularly* extending flange 48 at its upper edge which is attached to the top step 28 adjacent an end thereof. Extending from the rear edge of the plate 46 is an arm 50 which lies parallel with the top step 28 and is provided adjacent its end remote from the plate 46 with a slot 52 which opens through the upper edge of the arm 50 and extends toward the base plate 46 in spaced parallel relation to the upper edge of the arm 50 to define the hook 54, the purpose of which will hereinafter appear. Carried by and extending laterally from each arm 50 remote from each base plate 46 is an extension 56 carrying adjacent its end remote from the arm a flange 58 which lies in spaced parallel relation to the arm 50 and forms in conjunction with the extension 56 a hook shaped guide designated generally 59 which is adapted to partially embrace a side rail of the prop section of the ladder to be more fully hereinafter described. Struck from and extending outwardly from the flange 58 is a hook 60 which opens downwardly as illustrated in Fig. 6 and is adapted to receive the upper edge of the link 36 in order to cooperate with the arm 50 in forming a guide which completely embraces the side rail of the prop section of the ladder. A hook 62 is struck from and opens upwardly with relation to the arm 50 for engaging the bail of a paint pail, bucket or the like.

The prop section of the ladder designated generally 64 comprises spaced parallel elongated side rails 66 which are provided with longitudinally spaced openings 68 for the reception of transversely extending rungs 70, the topmost of which has threadedly engaged in opposite ends a shank 72 of a pin 74 which projects laterally beyond its adjacent side rail and is adapted to enter the slot 52 in an arm 50 and engage the under side of the hook 54 thereof when the device is in use as a step ladder.

Carried by the side rails 12 of the step section 10 of the ladder and extending rearwardly therefrom adjacent the step 16 nearest the top step 28 are rung receiving hooks 76 which open upwardly as illustrated in the drawings for receiving a rung 70 of the [top] *prop* section 64 when the device is used as an extension ladder.

In use when this combination ladder is employed as a step ladder, the parts are assembled substantially as illustrated in Fig. 1 with the pins 74 engaging the under sides of the hooks 54 and the links 36 swung downwardly as suggested in Fig. 1 and engaging hook members 78 carried by opposite side rails 66 of the front section 64 near the upper ends thereof. The [front] *prop* section 64 is thus held in proper relation to the step section 10 to bring the steps 16 substantially horizontal as will be readily understood upon reference to Fig. 1. With the parts thus assembled, a pail P may be suspended by its bail from the hook 62 within easy reach of the user of the ladder. When the device is to be used as an extension ladder as illustrated in Fig. 3, the pins 74 are disengaged from their locations beneath the hooks 54 and the prop section is slid longitudinally of the step section 10 with the side rails 66 lying parallel to the side rails 12. When the desired length of extension is attained, a rung of the prop section 64 is seated in the hooks 76 and the links 36 are moved upwardly about their pivots 34 to engage the hooks 60 in order that the rails 66 of the prop section 64 are completely embraced by the members 44 and links 36. It will thus be seen that the prop section will be held in properly assembled relation with the step section so that the ladder may serve as an extension ladder. When it is desired to support a scaffold or the like between the ladder sections 10 and 64, the extension section 64 may be entirely disengaged from the brackets 44 and the ladder sections 10 and 64 rested against opposite walls of a room so that a scaffold may be supported on the steps 16 and rungs 70 at a selected height from the floor.

When the ladder is to be used on a stairway the links 36 are swung about their pivots 34 to lie within the perimeter of the side rails 12 of the step section 10. This will enable the prop section 64 to be moved longitudinally relative to the step section 10. When the *prop section is in the selected position* [desired adjustment is achieved], the links 36 are moved about their pivots 34 and engaged [between] *with* the hooks 60 [and their respective guides 59] so that the links *then* extend across the path of movement of the rungs 70. In this position the prop section is moved until the lower rung 70 of the pair of *adjacent* rungs between which the links 36 extend will engage *both of these* [the] links 36 and arrest upward movement of the prop section *relative to the step section* so that when the ladder is placed on a stairway as shown in Figure 10, the step section will be held in proper position for use *on the steps of the stairway. Fig. 11 illustrates one of the links being pushed upwardly into engagement with the hooks 60.*

What is claimed is:

1. In a combination ladder of the type comprising a step section and a prop section having spaced elongated side rails and longitudinally spaced parallel rungs carried by the side rails and extending therebetween, spaced parallel brackets carried by the step section and extending outwardly therefrom adjacent the upper end thereof, hook shaped guides carried by the brackets remote from the step section for partially embracing the side rails of the prop section and slidably coupling said prop section to said step section, hooks carried by the guides and extending outwardly and downwardly from adjacent sides thereof, and links carried by the step section and adapted to be engaged with said hooks for engaging a rung of the prop section and arresting upward movement of the prop section relative to the step section.

2. In a combination ladder of the type comprising a step section and a prop section having spaced elongated side rails and longitudinally spaced parallel rungs carried by the side rails and extending therebetween, spaced parallel brackets carried by the step section and extending outwardly therefrom adjacent the upper end thereof, hook shaped guides carried by the brackets remote from the step section for partially embracing the side rails of the prop section and slidably coupling said prop section to said step section, hooks carried by the guides and extending outwardly and downwardly from adjacent sides thereof, and links carried by the step section and adapted to be engaged with said hooks for engaging a rung of the prop section and arresting upward movement of the prop section relative to the step section, said brackets having recesses [opening through] *formed in* the upper edges thereof adjacent the ends thereof remote from the step section and extending longitudinally toward the step section to define hooks which project away from the step section, said prop section extending between the brackets, pins carried by the prop section and extending laterally therefrom adjacent the upper end thereof for entering the recesses and engaging the bottom edges of said last named hooks.

*3. In an extension ladder, the combination of a prop section and a stepladder section each having side rails and rungs and steps, respectively, and adapted to be used on level surfaces or on stairways, and comprising means for pivotally connecting the two sections and said means including means extending around and slidably embracing the side rails of the prop section permitting longitudinal movement of the prop section relative to the step section, said latter means extending from the step section to the prop section at a position below the top of the step section and acting to limit the spreading action of the sections when the sections are at an acute angle and resting on a level surface and while the prop section is being pressed against the top of the step section, the prop section having spaced rigid shoulder surfaces corresponding to the spacing of the rungs of the prop section, elements carried by the step section and adapted to engage said shoulder surfaces when the prop section is at different elevated positions with relation to the step section and while the sections are at an included acute angle and each section is at an angle from the vertical.*

*4. The structure defined in claim 3 in which the elements engaging the spaced shoulders on the prop section*

*are links pivoted to the step section, and the means slidably embracing the side rails of the prop section is provided with a rigid stop adapted to engage said links and limit upward movement thereof.*

*5. The combination ladder defined in claim 1 in which said links are pivoted to the step section and in which fixed means are mounted on the prop section adapted to be engaged by said links to brace the sections against spreading movement.*

References Cited in the file of this patent or the original patent

UNITED STATES PATENTS

| | | |
|---|---|---|
| 485,900 | Tannenberg | Nov. 8, 1892 |
| 562,716 | Dyer | June 23, 1896 |
| 967,252 | Shields | Aug. 16, 1910 |
| 1,050,273 | Hattenback et al. | Jan. 14, 1913 |
| 1,078,072 | Tannenberg | Nov. 11, 1913 |
| 1,547,966 | Sherman | July 28, 1925 |
| 1,672,020 | Brugner | June 5, 1928 |
| 1,996,133 | White | Apr. 2, 1935 |
| 2,191,051 | Uecker et al. | Feb. 20, 1940 |
| 2,223,911 | Garnette | Dec. 3, 1940 |
| 2,226,228 | Kunde | Dec. 24, 1940 |
| 2,525,412 | Jasper | Oct. 10, 1950 |

FOREIGN PATENTS

| | | |
|---|---|---|
| 14,324 | France | Aug. 22, 1911 |
| 586,448 | France | Mar. 26, 1925 |
| 275,107 | Switzerland | May 15, 1951 |
| 46,720 | Denmark | Jan. 2, 1933 |